US012027356B2

(12) United States Patent
Hopfgartner et al.

(10) Patent No.: US 12,027,356 B2
(45) Date of Patent: Jul. 2, 2024

(54) METHOD OF PERFORMING IDA WITH CID-ECD

(71) Applicants: DH TECHNOLOGIES DEVELOPMENT PTE. LTD., Singapore (SG); University of Geneva, Geneva (CH)

(72) Inventors: Gérard Hopfgartner, Plan-les-Ouates (CH); Anita Orsolya Ducati, Dübendorf (CH); Ronald F. Bonner, Newmarket (CA); Yves Le Blanc, Newmarket (CA)

(73) Assignees: DH Technologies Development Pte. Ltd., Singapore (SG); University of Geneva, Geneva (CH)

( * ) Notice: Subject to any disclaimer, the term of this patent is extended or adjusted under 35 U.S.C. 154(b) by 349 days.

(21) Appl. No.: 17/597,763

(22) PCT Filed: Jul. 22, 2020

(86) PCT No.: PCT/IB2020/056898
§ 371 (c)(1),
(2) Date: Jan. 21, 2022

(87) PCT Pub. No.: WO2021/014379
PCT Pub. Date: Jan. 28, 2021

(65) Prior Publication Data
US 2022/0262610 A1 Aug. 18, 2022

Related U.S. Application Data

(60) Provisional application No. 62/877,173, filed on Jul. 22, 2019.

(51) Int. Cl.
*H01J 49/00* (2006.01)

(52) U.S. Cl.
CPC ........ *H01J 49/0031* (2013.01); *H01J 49/005* (2013.01); *H01J 49/0054* (2013.01)

(58) Field of Classification Search
CPC ... H01J 49/0031; H01J 49/005; H01J 49/0054
(Continued)

(56) References Cited

U.S. PATENT DOCUMENTS

2014/0099725 A1* 4/2014 Williams ............ G01N 27/623 436/87
2017/0069475 A1* 3/2017 Brown ................ G01N 27/622
(Continued)

OTHER PUBLICATIONS

International Search Report and Written Opinion for PCT/IB2020/056898, dated Sep. 28, 2020.
(Continued)

*Primary Examiner* — Kiet T Nguyen
(74) *Attorney, Agent, or Firm* — Kasha Law LLC; John R. Kasha; Kelly L. Kasha

(57) ABSTRACT

Apparatus is provided and an IDA method is modified to detect and separately dissociate alkali-metal adducts of a compound. An ion source device ionizes one or more compounds of a sample, producing an ion beam. A mass filter selects a mass range of precursor ions from the ion beam, a mass analyzer measures intensities and m/z values of the precursor ions, and one or more of the precursor ions are selected for a peak list. For each pair of precursor ions of the peak list, if an m/z difference between the pair corresponds to an m/z difference between an alkali metal ion and another alkali metal ion or a proton, an ExD device is used to dissociate one precursor ion or both precursor ions of the pair using the processor. A CID device is used to dissociate all other precursor ions of the peak list.

15 Claims, 7 Drawing Sheets

(58) Field of Classification Search
USPC .................................................. 250/282, 281
See application file for complete search history.

(56) References Cited

U.S. PATENT DOCUMENTS

| | | | | |
|---|---|---|---|---|
| 2017/0213713 | A1 | 7/2017 | Green et al. | |
| 2019/0004071 | A1 * | 1/2019 | Takahashi ........... | H01J 49/0036 |
| 2023/0005727 | A1 * | 1/2023 | Le Blanc ............ | H01J 49/0045 |

OTHER PUBLICATIONS

Jackie A. Mosely et al. “Electron-Induced Dissociation of Singly Charged Organic Cations as a Tool for Structural Characterization of Pharmaceutical Type Molecules,” Analytical Chemistry, vol. 83, No. 11, Apr. 7, 2011, pp. 4068-4075.

* cited by examiner

METHOD OF PERFORMING IDA WITH CID-ECD

RELATED APPLICATIONS

This application claims the benefit of U.S. Provisional Patent Application Ser. No. 62/877,173, filed on Jul. 22, 2020, the content of which is incorporated by reference herein in its entirety.

INTRODUCTION

The teachings herein relate to mass spectrometry apparatus for detecting and separately dissociating alkali-metal adducts of a compound in an information dependent acquisition (IDA) mass spectrometry experiment. More specifically, alkali-metal adducts are identified from an IDA survey peak list by analyzing each pair of precursor ions of the peak list and determining if the mass-to-charge ratio (m/z) difference between the pair corresponds to the m/z difference between an alkali metal ion and another alkali metal ion or a proton. If a pair is found to include one or two alkali-metal adducts, one precursor ion or both precursor ions of the pair are dissociated using an electron-based dissociation (ExD) device. All other ions of the IDA peak list are dissociated using a collision-induced dissociation (CID) device.

The apparatus and methods disclosed herein are also performed in conjunction with a processor, controller, microcontroller, or computer system, such as the computer system of FIG. 1.

Mass Spectrometry Background

Mass spectrometry (MS) is an analytical technique for detection and quantitation of chemical compounds based on the analysis of m/z values of ions formed from those compounds. MS involves ionization of one or more compounds of interest from a sample, producing precursor ions, and mass analysis of the precursor ions.

Tandem mass spectrometry or mass spectrometry/mass spectrometry (MS/MS) involves ionization of one or more compounds of interest from a sample, selection of one or more precursor ions of the one or more compounds, fragmentation of the one or more precursor ions into product ions, and mass analysis of the product ions.

Mass spectrometers are often coupled with chromatography or other separation systems in order to identify and characterize eluting compounds of interest from a sample. In such a coupled system, the compounds in the eluting solvent are ionized and a series of mass spectra are obtained at specified time intervals. These times range from, for example, 1 second to 100 minutes or greater. Intensity values derived from the series of mass spectra form a chromatogram. For example, the sum of all intensities generates a Total Ion Chromatogram (TIC) and the intensity of one mass value generates an extracted ion chromatogram (XIC).

Peaks found in the chromatograms are used to identify or characterize a known peptide or compound in the sample because they elute at known times called retention times. More particularly, the retention times of peaks and/or the area of peaks are used to identify or characterize (quantify) a known peptide or compound in the sample.

In traditional separation coupled mass spectrometry systems, a precursor ion of a known compound is selected for analysis. An MS/MS scan is then performed at each interval of the separation for a mass range that includes the precursor ion. The intensity of the product ions found in each MS/MS scan is collected over time and analyzed as a collection of spectra, or an XIC, for example.

Both MS and MS/MS can provide qualitative and quantitative information. The measured precursor or product ion spectrum can be used to identify a molecule of interest. The intensities of precursor ions and product ions can also be used to quantitate the amount of the compound present in a sample.

A large number of different types of experimental acquisition methods or workflows can be performed using a tandem mass spectrometer. Three broad categories of these workflows are targeted acquisition, information dependent acquisition (IDA) or data-dependent acquisition (DDA), and data-independent acquisition (DIA).

In a targeted acquisition method, one or more transitions of a precursor ion to a product ion are predefined or known for a compound of interest. As a sample is being introduced into the tandem mass spectrometer, the one or more transitions are monitored during each time period or cycle of a plurality of time periods or cycles. In other words, the mass spectrometer selects and fragments the precursor ion of each transition and performs a targeted mass analysis for the product ion of the transition. As a result, an intensity (a product ion intensity) is produced for each transition. Targeted acquisition methods include, but are not limited to, multiple reaction monitoring (MRM) and selected reaction monitoring (SRM).

In an IDA method, a user can specify criteria for performing an untargeted mass analysis of product ions while a sample is being introduced into the tandem mass spectrometer. For example, in an IDA method a precursor ion or mass spectrometry (MS) survey scan is performed to generate a precursor ion peak list. The user can select criteria to filter the peak list for a subset of the precursor ions on the peak list. MS/MS is then performed on each precursor ion of the subset of precursor ions. A product ion spectrum is produced for each precursor ion. An MS survey scan followed by multiple MS/MS scans can be repeatedly (iteratively) performed on the precursor ions of the subset of precursor ions as the sample is being introduced into the tandem mass spectrometer. IDA can also be called data-dependent analysis (Thermo Fisher) or data-directed analysis (Waters). The term "DATA-DEPENDENT" is trademarked by Thermo Fisher and the term "DDA" is trademarked by Waters, for example.

Measurement of complex (e.g. biological) samples by different omics techniques, such as proteomics, metabolomics, etc. leads to different types, large numbers and wide dynamic ranges of compounds. In proteomics and many other sample types the complexity and dynamic range of compounds are very large. This poses challenges for traditional targeted and IDA methods, requiring very high-speed MS/MS acquisition to deeply interrogate the sample in order to both identify and quantify a broad range of analytes.

As a result, DIA methods, the third broad category of tandem mass spectrometry, were developed. These DIA methods have been used to increase the reproducibility and comprehensiveness of data collection from complex samples. DIA methods can also be called non-specific fragmentation methods. In a traditional DIA method, the actions of the tandem mass spectrometer are not varied among MS/MS scans based on data acquired in a previous precursor or product ion scan. Instead, a precursor ion mass range is selected. A precursor ion mass selection window is then stepped across the precursor ion mass range. All precursor ions in the precursor ion mass selection window are fragmented, and all of the product ions of all of the precursor ions in the precursor ion mass selection window are mass analyzed.

Fragmentation Techniques Background

Electron-based dissociation (ExD), ultraviolet photodissociation (UVPD), infrared photodissociation (IRMPD), and collision-induced dissociation (CID) are often used as fragmentation techniques for tandem mass spectrometry (MS/MS). CID is the most conventional technique for dissociation in tandem mass spectrometers.

ExD can include, but is not limited to, electron-induced dissociation (EID), electron impact excitation in organics (EIEIO), electron capture dissociation (ECD), or electron transfer dissociation (ETD).

Alkali Metal Adduct IDA Problem

Performing analysis via IDA acquisition is one of the most broadly used methods of generating MS/MS information in an automated fashion. Over the years, several filters to filter the peak list for a subset of precursor ions to be dissociated have been developed to optimize automated selection of the ions of interest in a specific application. These filters have included charge state selection for peptides, mass defect for metabolites of interest, isotope ratio criteria for pesticides, and dynamic background subtraction for compounds with a liquid chromatography (LC) profile. However, little or no effort has been made to ensure that singly or multiply charged ions selected in real time will systematically yield MS/MS information that can be used for identification.

Ionization often occurs by adding a proton to the molecule producing an $[M+H]^+$ ion, but other forms, known as adducts, can be produced by adding alkali metal ions such as sodium ($Na^+$) to give $[M+Na]^+$, potassium $[M+K]^+$ or lithium $[M+Li]^+$. When performing MS/MS on a protonated compound ($[M+H]^+$), CID generally yields fragment ions that can lead to compound identification. However, when CID-MS/MS is performed on equivalent alkali-metal adducts of the same compound, such as $[M+Na]^+$ or $[M+K]^+$, weak or no fragment ions are typically observed. This reduces the effectiveness of IDA and the amount of information generated in metabolomic applications.

Mosely et al., *Anal. Chem.* 2011, 83, 4068-4075, and others have recently reported that EID and EIEIO can be used to dissociate singly charged alkali-metal adducts. Similarly, it is well known that ECD and ETD can be used to preferentially dissociate large multiply charged compounds such as peptide and protein backbones. However, it is also well known that ExD methods are not well suited to dissociate singly charged protonated compounds ($[M+H]^+$).

As a result, additional apparatus and methods are needed to allow alkali-metal adducts to be dissociated in an IDA experiment.

SUMMARY

An apparatus, method, and computer program product are disclosed for detecting and separately dissociating alkali-metal adducts of a compound in an IDA mass spectrometry experiment. The apparatus includes an ion source device and a tandem mass spectrometer. The tandem mass spectrometer includes a mass filter device, an ExD device, a CID device, and a mass analyzer. The ion source device 210 ionizes one or more compounds of a sample, producing an ion beam.

In a first time period of an IDA experiment, the tandem mass spectrometer first creates a precursor ion peak list using an MS survey scan. The mass filter device transmits a mass range of precursor ions from the ion beam. The mass analyzer measures intensities and m/z values of the precursor ions. The tandem mass spectrometer or a processor then selects one or more of the measured precursor ions for the peak list.

In a second time period of the IDA experiment, the tandem mass spectrometer selects and dissociates each precursor ion of the peak list. Each precursor ion of the peak list is selected from the ion beam using the mass filter device. Before selecting each precursor ion, every possible pair of precursor ions is examined using the mass analyzer to determine if the pair includes at least one alkali-metal adduct.

In this examination, the m/z difference between each pair is compared to the m/z values of one or more alkali metal ions minus the m/z of a proton. The m/z difference between each pair is also compared to each difference between the m/z values of one or more different combinations of two different alkali metal ions.

Based on the examination of each pair of the peak list, the type of dissociation is determined. Specifically, for each pair of precursor ions of the peak list, if an m/z difference between the pair corresponds to the difference between an alkali metal ion and a proton (e.g. $Na^+$—$H^+$) or a difference between m/z values of two different alkali metal ions, one precursor ion or both precursor ions of the pair is dissociated using the ExD device. All other precursor ions of the peak list are dissociated using the CID device.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

Figure 1:
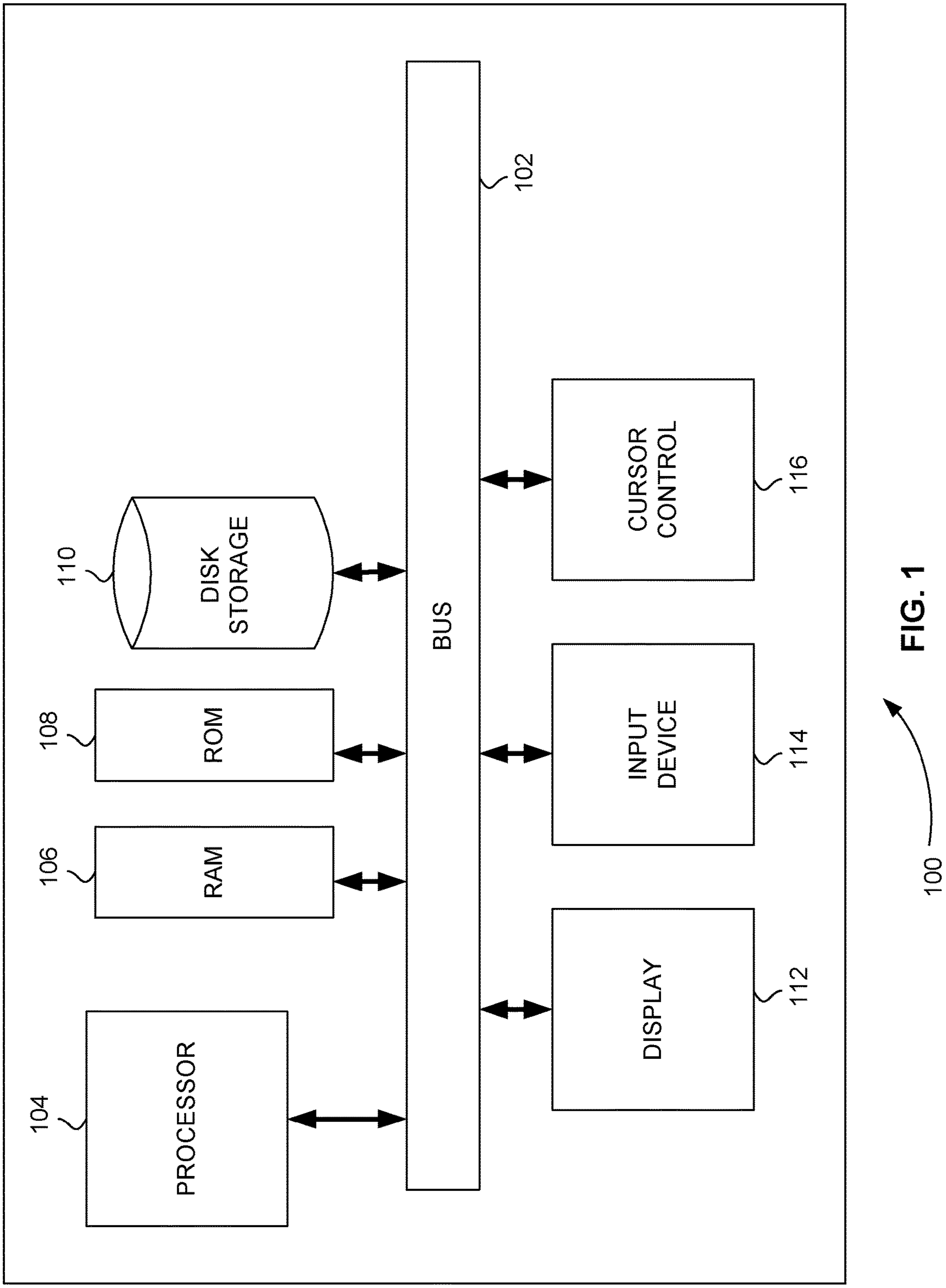
FIG. 1 is a block diagram that illustrates a computer system, upon which embodiments of the present teachings may be implemented.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively, hard-wired circuitry may be used in place of or in combination with software instructions to implement the present teachings. Thus implementations of the present teachings are not limited to any specific combination of hardware circuitry and software.

In various embodiments, computer system 100 can be connected to one or more other computer systems, like computer system 100, across a network to form a networked system. The network can include a private network or a public network such as the Internet. In the networked system, one or more computer systems can store and serve the data to other computer systems. The one or more computer systems that store and serve the data can be referred to as servers or the cloud, in a cloud computing scenario. The one or more computer systems can include one or more web servers, for example. The other computer systems that send and receive data to and from the servers or the cloud can be referred to as client or cloud devices, for example.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software, but the present teachings may be implemented as a combination of hardware and software or in hardware alone. The present teachings may be implemented with both object-oriented and non-object-oriented programming systems.

Detection and Dissociation of Alkali-Metal Adducts in Ida

As described above, performing analysis via IDA acquisition is one of the most broadly used methods of generating MS/MS information in an automated fashion. However, little or no effort has been made to ensure that singly charged ions selected in real time will systematically yield MS/MS information that can be used for identification. In particular, when CID-MS/MS is performed on alkali-metal adducts of a compound, no or very few fragment ions are typically observed. This reduces the effectiveness and efficiency (time is wasted) of IDA and the amount of information generated in metabolomic applications.

It is known that EID and EIEIO can be used to dissociate singly charged alkali-metal adducts. Similarly, it is known that ECD and ETD can be used to preferentially dissociate large multiply charged compounds such as peptide and protein backbones. However, ExD methods are not well suited to dissociate singly charged protonated compounds. As a result, additional apparatus and methods are needed to allow alkali-metal adducts to be dissociated in an IDA experiment.

In various embodiments, additional apparatus is provided and an IDA method is modified to detect and separately dissociate alkali-metal adducts of a compound in an IDA experiment. As described above, it has been observed that performing ExD (>8 eV) on alkali-metal adducts of compounds can yield useful fragmentation with mixtures of fragments in the form of $Frag^+$ and $[Frag+ Alkali]^+$. However, when ExD is performed on the $[M+H]^+$ form, the efficiency is typically lower and yields very little new/complementary fragmentation information on the compound when compared to CID fragmentation.

In various embodiments, having a means to differentiate in real-time ions that are protonated ($[M+H]^+$) from those originating from alkali-metal adducts ($[M+Na]^+$ or $[M+H]^+$) enables IDA to generate MS/MS fragmentation of compounds that would generate the highest yield, CID and ExD, respectively. One means of detecting sodiated or potassiated compounds, for example, is to look for evidence of mass pairs that have an exact difference corresponding to the difference in m/z between a proton and sodium ion ($Na^+$) (delta mass 21.9819) or potassium ion ($K^+$) (delta mass 37.9559). The observed differences are equivalent to $Na^+—H^+$ (21.981944) and $K^+—H^+$ (37.955881). For the higher mass ions, corresponding to the alkali metal adducts, MS/MS data is collected using an ExD device.

Additionally, in various embodiments, detecting peaks that have a mass difference equivalent to the mass difference between sodium and potassium ions (38.963158−22.989221=15.973937), for example, can equally reveal compounds that only ionize in their alkali-metal adduct forms, and can also be selected for ExD fragmentation. In other words, detecting a peak pair where the m/z difference between the pair corresponds to a difference between m/z values of two different alkali metal ions can also be used to detect alkali-metal adducts of a compound. All other peaks are assumed to originate from protonated compounds and are subjected to CID MS/MS analysis.

IDA Alkali-Metal Adduct Detection and Dissociation Apparatus

Figure 2:
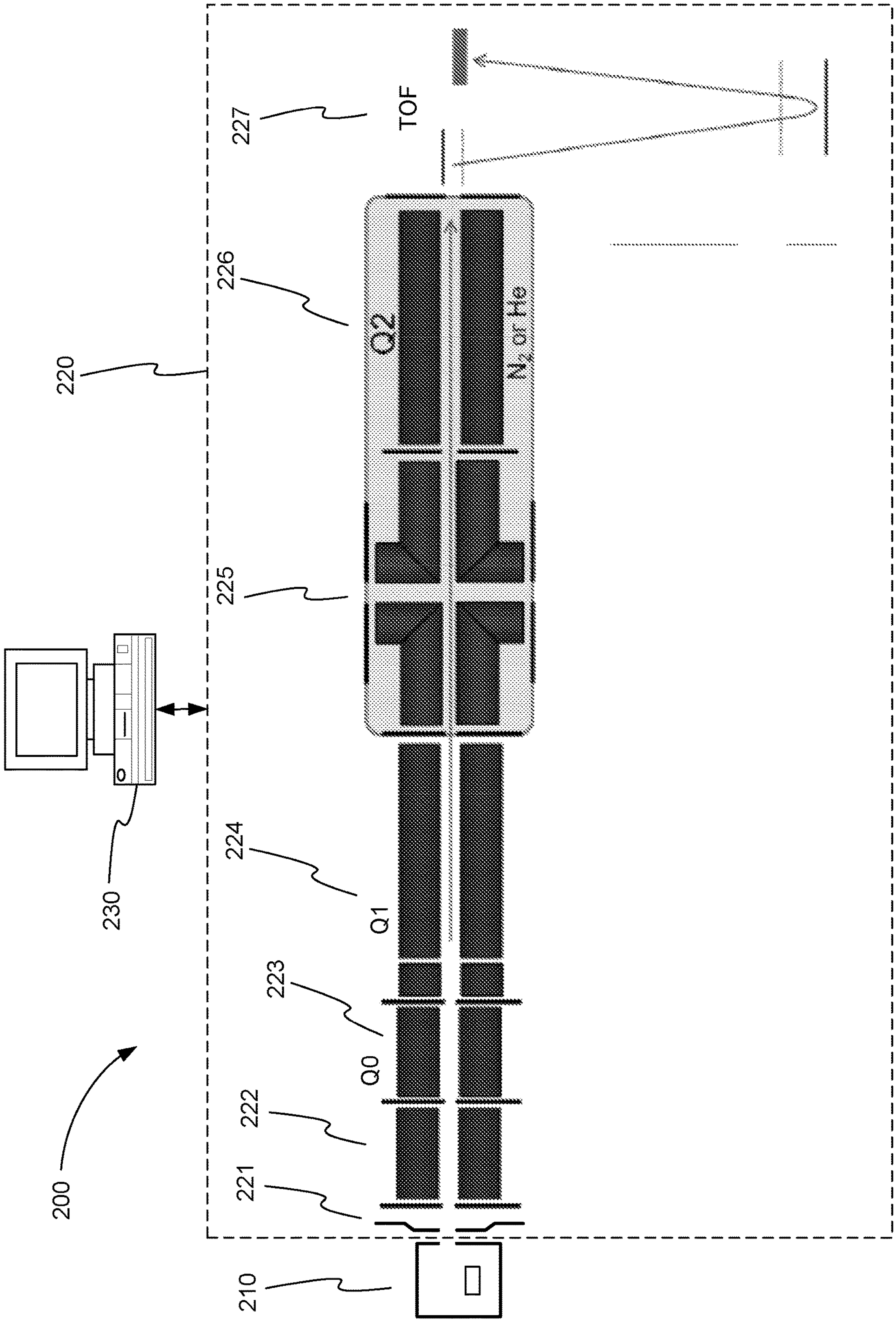
FIG. 2 is a schematic diagram of apparatus for detecting and separately dissociating alkali-metal adducts of a compound in an information dependent acquisition (IDA) mass spectrometry experiment, in accordance with various embodiments.

FIG. 2 is a schematic diagram 200 of apparatus for detecting and separately dissociating alkali-metal adducts of a compound in an IDA mass spectrometry experiment, in accordance with various embodiments. The apparatus of FIG. 2 includes ion source device 210 and tandem mass spectrometer 220.

Ion source device 210 ionizes one or more compounds of a sample, producing an ion beam. Ion source device 210 can be, but is not limited to, an electrospray ion source (ESI) device, a chemical ionization (CI) source device such as an atmospheric pressure chemical ionization source (APCI) device, atmospheric pressure photoionization (APPI) source device, or a matrix-assisted laser desorption source (MALDI) device. In an exemplary embodiment, ion source device 210 is an ESI device.

Tandem mass spectrometer 220 includes mass filter device 224, ExD device 225, CID device 226, and mass analyzer 227. In a first time period of an IDA experiment, tandem mass spectrometer 220 first creates a precursor ion peak list. Tandem mass spectrometer 220 creates the precursor ion peak list using mass filter device 224 and mass analyzer 227. Mass filter device 224 transmits precursor ions from the ion beam. Mass analyzer 227 measures intensities and m/z values of the precursor ions. Tandem mass spectrometer 220 then selects one or more of the measured precursor ions for the peak list. In an IDA method, the most intense measured precursor ions are selected for the peak list, for example.

Mass filter device 224, in an exemplary embodiment shown in FIG. 2, is a Q1 quadrupole. However, mass filter device 224 can be any type of mass filter, such as an ion trap.

Mass analyzer 227, in an exemplary embodiment shown in FIG. 2, is a time-of-flight (TOF) mass analyzer. However, mass analyzer 227 can be any type of mass analyzer including, but not limited to, a quadrupole, an ion trap, a linear ion trap, an orbitrap, or a Fourier transform ion cyclotron resonance mass analyzer.

In a second time period of the IDA experiment, tandem mass spectrometer 220 selects and dissociates each precursor ion of the peak list. Each precursor ion of the peak list is selected from the ion beam using mass filter device 224. Before selecting each precursor ion, every possible pair of precursor ions is examined using mass analyzer 227 to determine if a pair includes at least one alkali-metal adduct. In this examination, the m/z difference between each pair is compared to an m/z difference between an alkali metal ion and another alkali metal ion or a proton. In various embodiments, tandem mass spectrometer 220 can filter the peak list before selecting and dissociating each peak. For example, previously analyzed peaks can be removed.

Figure 3:
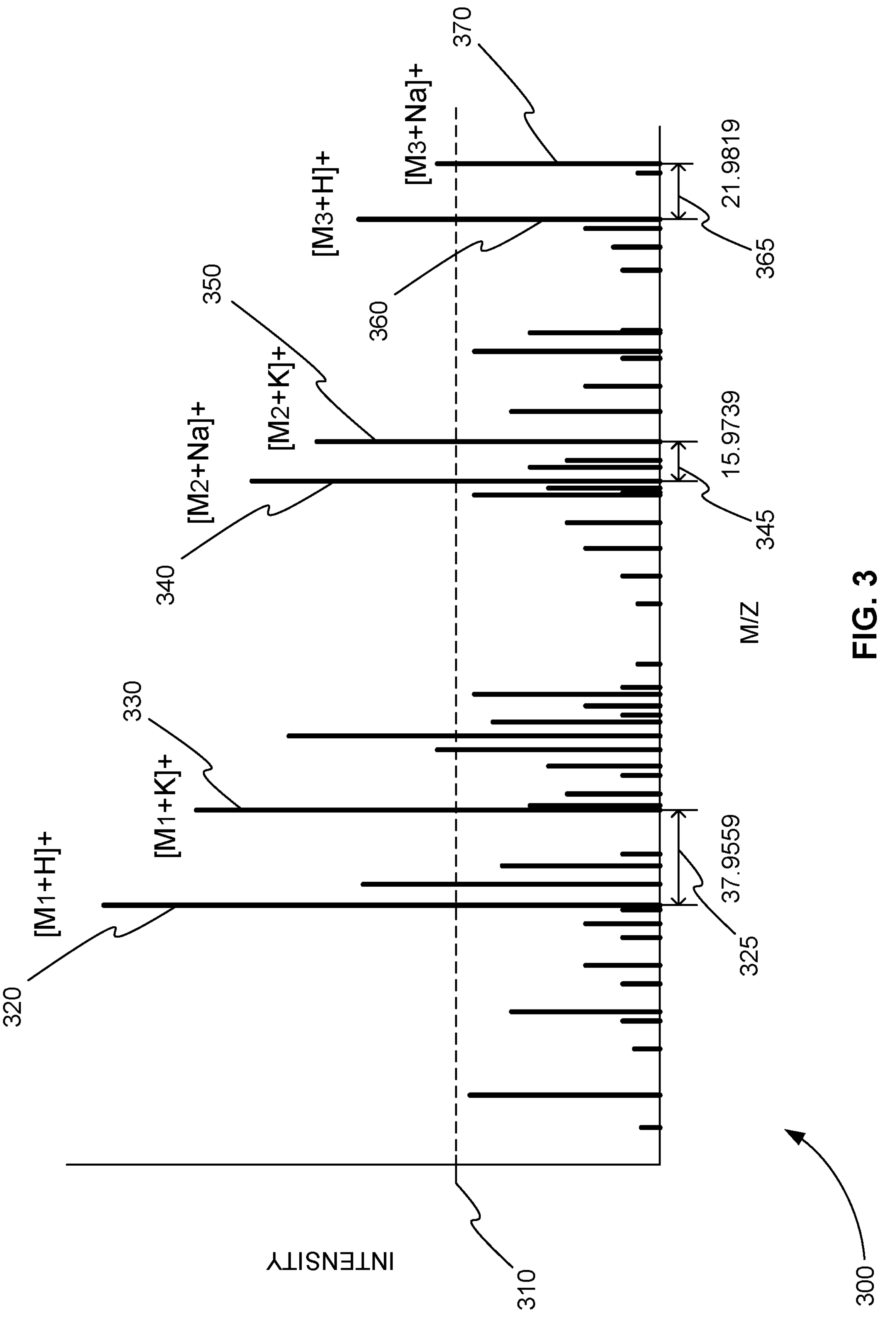
FIG. 3 is an exemplary plot of a hypothetical precursor ion spectrum showing how pairs of precursor ions are examined to determine if the pair includes at least one alkali-metal adduct, in accordance with various embodiments.

FIG. 3 is an exemplary plot 300 of a hypothetical precursor ion spectrum showing how pairs of precursor ions are examined to determine if the pair includes at least one alkali-metal adduct, in accordance with various embodiments. In FIG. 3, nine precursor ion peaks are found to be above threshold intensity 310 and are selected for the IDA peak list, for example. Every possible unique pair of the nine precursor ions is examined to determine if a pair includes at least one alkali-metal adduct.

First, the m/z difference between each pair is compared to the m/z differences between one or more alkali metal ions and a proton, that is $X^+—H^+$ (equivalent to X—H). For example, the m/z difference is compared to the m/z value of sodium minus the m/z of a proton (21.9819) or potassium minus the m/z of a proton (37.9559).

From this first comparison, it is found that difference 325 in m/z value between peak 320 and peak 330 is 37.9559. From difference 325, it is determined that peak 320 is the protonated form $[M_1\text{-}41]^+$ of the compound $M_1$ and peak 330 is the potassiated form or adduct $[M_1+K]^+$ of the compound $M_1$. It is also found that difference 365 in m/z value between peak 360 and peak 370 is 21.9819. From difference 365, it is determined that peak 360 is the protonated form $[M_3+H]^+$ of the compound $M_3$ and peak 370 is the sodiated form or adduct $[M_3+Na]^+$ of the compound $M_3$.

The m/z difference between each pair is also compared to each difference between the m/z values of one or more different combinations of two different alkali metal ions in a second comparison. For example, the m/z difference is compared to the difference between the m/z values of sodium and potassium ions (38.963158−22.989221=15.973937). From this second comparison it is found that difference 345 in m/z value between peak 340 and peak 350 is 15.9739. From difference 345, it is determined that peak 340 is the sodiated form $[M_2+Na]^+$ of the compound $M_2$, and peak 350 is the potassiated form or adduct $[M_2+K]^+$ of the compound $M_2$.

The implication here is that the $[M_2+H]^+$ form is not in the list. For example, it does not exist or is below threshold intensity 310. In various embodiments, for example, if a alkali-metal adduct of the compound $M_2$ ($[M_2+Na]^+$ or $[M_{2+1}]^+$) is found and the protonated form ($[M_2+H]^+$) of the compound is not in the list, peaks below threshold intensity 310 can be analyzed to find the protonated form. If the peak for the protonated form is found, it can be fragmented using CID.

As described below, in various embodiments, if an m/z difference between a pair of precursor ions corresponds to the difference between an alkali metal ion and a proton (e.g. $Na^+$—$H^+$), one precursor ion of the pair is dissociated using an ExD device. The precursor ion of the pair that has a higher m/z value is dissociated using an ExD device, for example. In this case, all precursor ions that have the m/z value of peak 330 are dissociated using an ExD device, since peak 330 has the higher m/z value. All precursor ions that have the m/z value of peak 320 are dissociated using a CID device.

In various embodiments, if an m/z difference between a pair of precursor ions corresponds to a difference between m/z values of two different alkali metal ions, one precursor ion or both precursor ions of the pair are dissociated using an ExD device. If one precursor ion of the pair is dissociated using an ExD device, the precursor ion of the pair that has a higher m/z value or that has a higher intensity can be dissociated using an ExD device. In this case, all precursor ions that have the m/z value of peak 340 or peak 350 can be dissociated using an ExD device. If just one precursor ion of the pair is dissociated and the selection criterion is a higher intensity, then all precursor ions that have the m/z value of peak 340 are dissociated using an ExD device. If just one precursor ion of the pair is dissociated and the selection criterion is a higher m/z value, then all precursor ions that have the m/z value of peak 350 are dissociated using an ExD device.

Returning to FIG. 2, based on the examination of each pair of the peak list, the type of dissociation is determined. Specifically, for each pair of precursor ions of the peak list, if an m/z difference between the pair corresponds to the m/z difference between an alkali metal ion and a proton (e.g. $Na^+$—$H^+$) or a difference between m/z values of two different alkali metal ions, one precursor ion or both precursor ions of the pair is dissociated using ExD device 225. All other precursor ions of the peak list are dissociated using the CID device 226.

ExD device 225, in an exemplary embodiment shown in FIG. 2, is a Chimera device. However, ExD device 225 can be any type of ExD device including, but not limited to, an EID, EIEIO, ECD, or ETD device.

Figure 4:
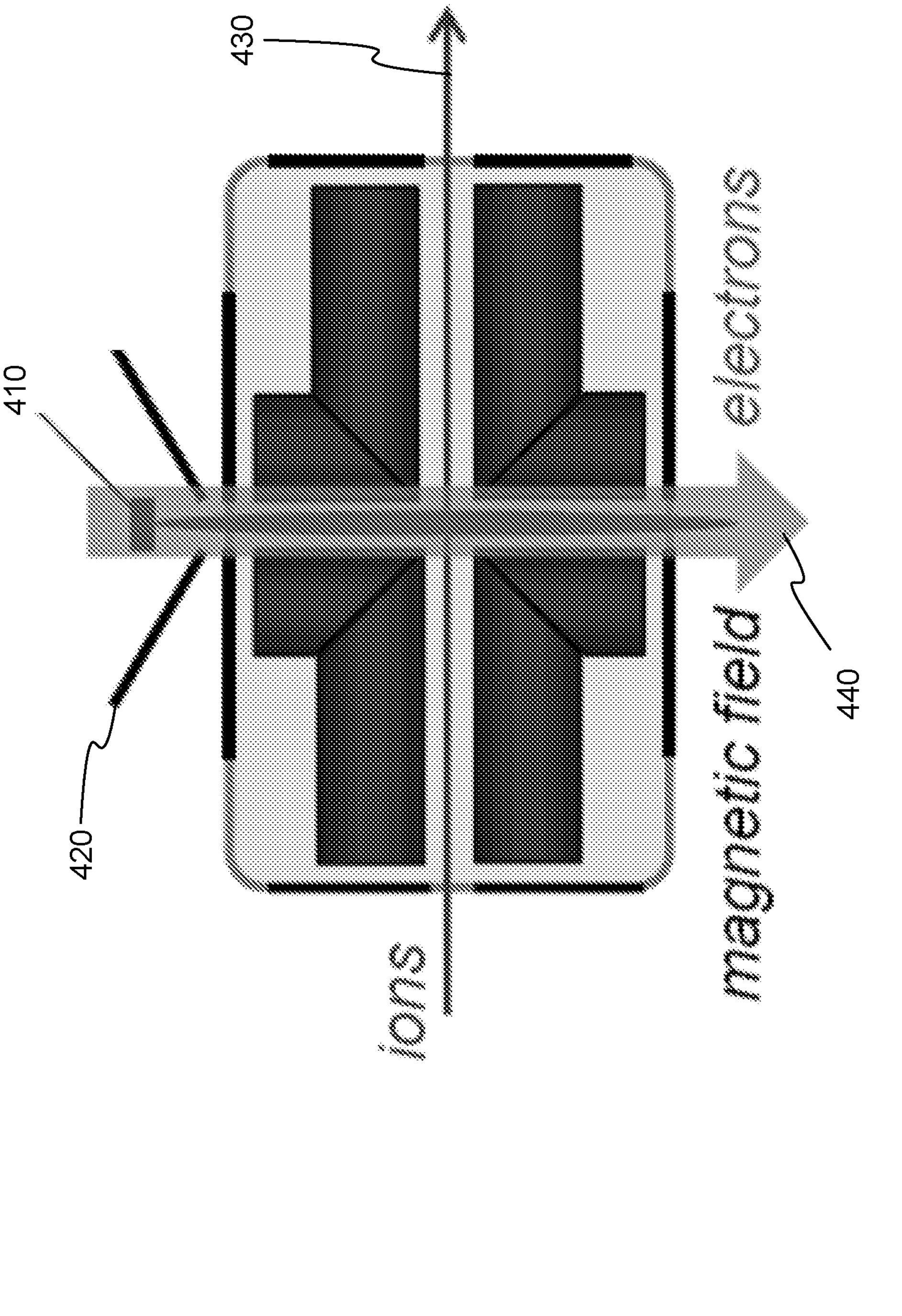
FIG. 4 is a schematic diagram of a Chimera ExD device, in accordance with various embodiments.

FIG. 4 is a schematic diagram 400 of a Chimera ExD device, in accordance with various embodiments. The Chimera ExD device includes electron emitter or filament 410 and electron gate 420. Electrons are emitted perpendicular to the flow of ions 430 and parallel to the direction of magnetic field 440.

Figure 5:
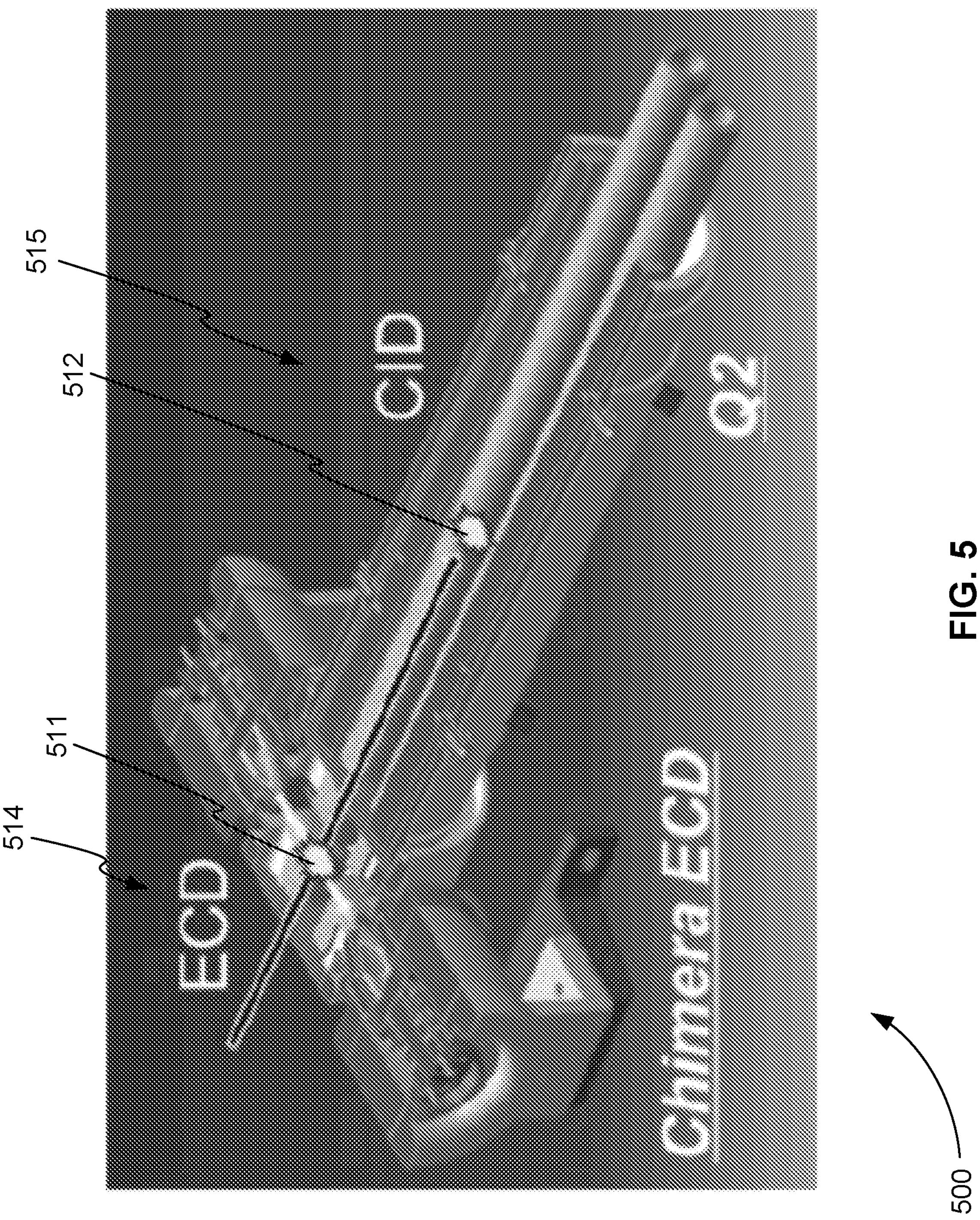
FIG. 5 is a cutaway three-dimensional perspective view of a Chimera ExD and CID collision cell, in accordance with various embodiments.

FIG. 5 is a cutaway three-dimensional perspective view 500 of a Chimera ExD and CID collision cell, in accordance with various embodiments. FIG. 5 shows that fragmentation of precursor ions can be performed selectively at location 511 in Chimera ExD 514 or at location 512 in CID collision cell 515.

Returning to FIG. 2, in various embodiments, in the second time period of the IDA experiment, mass analyzer 227 is used to further measure intensities and m/z values of product ions of each precursor ion dissociated using ExD device 225, producing an ExD product ion spectrum for each precursor ion dissociated using ExD device 225.

In various embodiments, tandem mass spectrometer 220 further identifies a compound of the sample by comparing an ExD product ion spectrum to a spectral library of product ions produced by ExD. A spectral library of product ions produced by ExD is similar to those produced by electron ionization or electron impact (EI). The national institute of standards and technology (NIST) spectral library provides electron impact ionization (EI) reference spectra of hundreds of thousands of compounds produced by gas chromatography coupled to mass spectrometry (GC-MS). EI spectra consist of the precursor molecular radical cation $M^{\cdot+}$ and characteristic fragments. EID of alkali-metal adducts of singly charged compounds provide spectra where $M^{\cdot+}$ and the EI-characteristic fragments are present, therefore compound identification from an EID spectrum by comparing it with EI spectra is possible.

Similarly, in various embodiments, tandem mass spectrometer 220 further identifies a compound of the sample by comparing a CID product ion spectrum to a spectral library of product ions produced by CID.

In various embodiments, if an m/z difference between a pair corresponds to the difference between an alkali metal ion and a proton (e.g. $Na^+$—$H^+$), tandem mass spectrometer 220 dissociates one precursor ion of the pair using ExD device 225. The precursor ion of the pair that has a higher m/z value is dissociated using ExD device 225, for example.

In various embodiments, if an m/z difference between a pair corresponds to a difference between m/z values of two different alkali metal ions, tandem mass spectrometer 220 dissociates one precursor ion or both precursor ions of the pair using ExD device 225. If one precursor ion of the pair is dissociated using ExD device 225, the precursor ion of the pair that has a higher m/z value or that has a higher intensity can be dissociated using ExD device 225.

In various embodiments, the alkali metal ion includes one of a lithium ion ($Li^+$), a sodium ion ($Na^+$), a potassium ion ($K^+$), a rubidium ion ($Rb^+$), a caesium ion ($Cs^+$), or a francium ion ($Fr^+$). The two different alkali metal ions include any two of $Li^+$, $Na^+$, K+, $Rb^+$, $Cs^+$, or $Fr^+$.

In various embodiments, ExD device 225 performs one of EID or EIEIO for singly charged precursor ions and one of ECD or ETD for multiply charged precursor ions.

In various embodiments, processor 230 is used to control or provide instructions to ion source device 210, tandem mass spectrometer 220, mass filter device 224, ExD device 225, CID device 226, and mass analyzer 227 and to analyze data collected. Processor 230 controls or provides instructions by, for example, controlling one or more voltage, current, or pressure sources (not shown). Processor 230 can be a separate device as shown in FIG. 2 or can be a processor or controller of one or more devices of tandem mass spectrometer 220. Processor 230 can be, but is not limited to, a controller, a computer, a microprocessor, the computer system of FIG. 1, or any device capable of sending and receiving control signals and data.

In various embodiments, tandem mass spectrometer 220 can further include orifice and skimmer 221, ion guide 222, and Q0 ion guide 223.

IDA Alkali-Metal Adduct Detection and Dissociation Method

Figure 6:
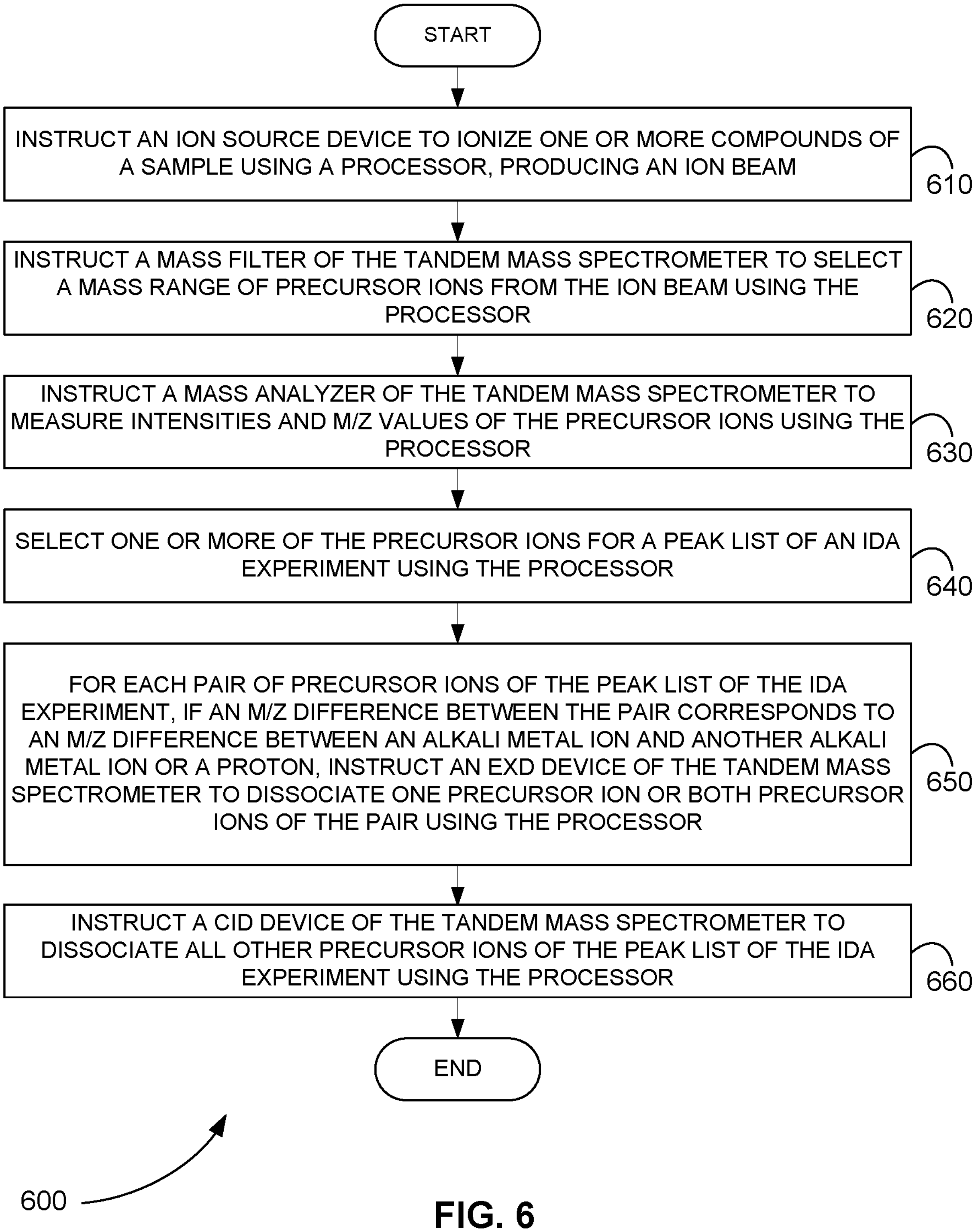
FIG. 6 is a flowchart showing a method for detecting and separately dissociating alkali-metal adducts of a compound in an IDA mass spectrometry experiment, in accordance with various embodiments.

FIG. 6 is a flowchart showing a method 600 for detecting and separately dissociating alkali-metal adducts of a compound in an IDA mass spectrometry experiment, in accordance with various embodiments.

In step 610 of method 600, an ion source device is instructed to ionize one or more compounds of a sample using a processor, producing an ion beam.

In step 620, a mass filter of a tandem mass spectrometer is instructed to transmit a mass range of precursor ions from the ion beam using the processor.

In step 630, a mass analyzer of the tandem mass spectrometer is instructed to measure intensities and m/z values of the precursor ions using the processor.

In step 640, one or more of the precursor ions are selected for a peak list of an IDA experiment using the processor.

In step 650, for each pair of precursor ions of the peak list of the IDA experiment, if an m/z difference between the pair corresponds to an m/z difference between an alkali metal ion and another alkali metal ion or a proton, an ExD device of the tandem mass spectrometer is instructed to dissociate one precursor ion or both precursor ions of the pair using the processor.

In step 650, a CID device of the tandem mass spectrometer is instructed to dissociate all other precursor ions of the peak list of the IDA experiment using the processor.

IDA Alkali-Metal Adduct Detection and Dissociation Computer Program Product

In various embodiments, computer program products include a tangible computer-readable storage medium whose contents include a program with instructions being executed on a processor so as to perform a method for detecting and separately dissociating alkali-metal adducts of a compound in an IDA mass spectrometry experiment. This method is performed by a system that includes one or more distinct software modules.

Figure 7:
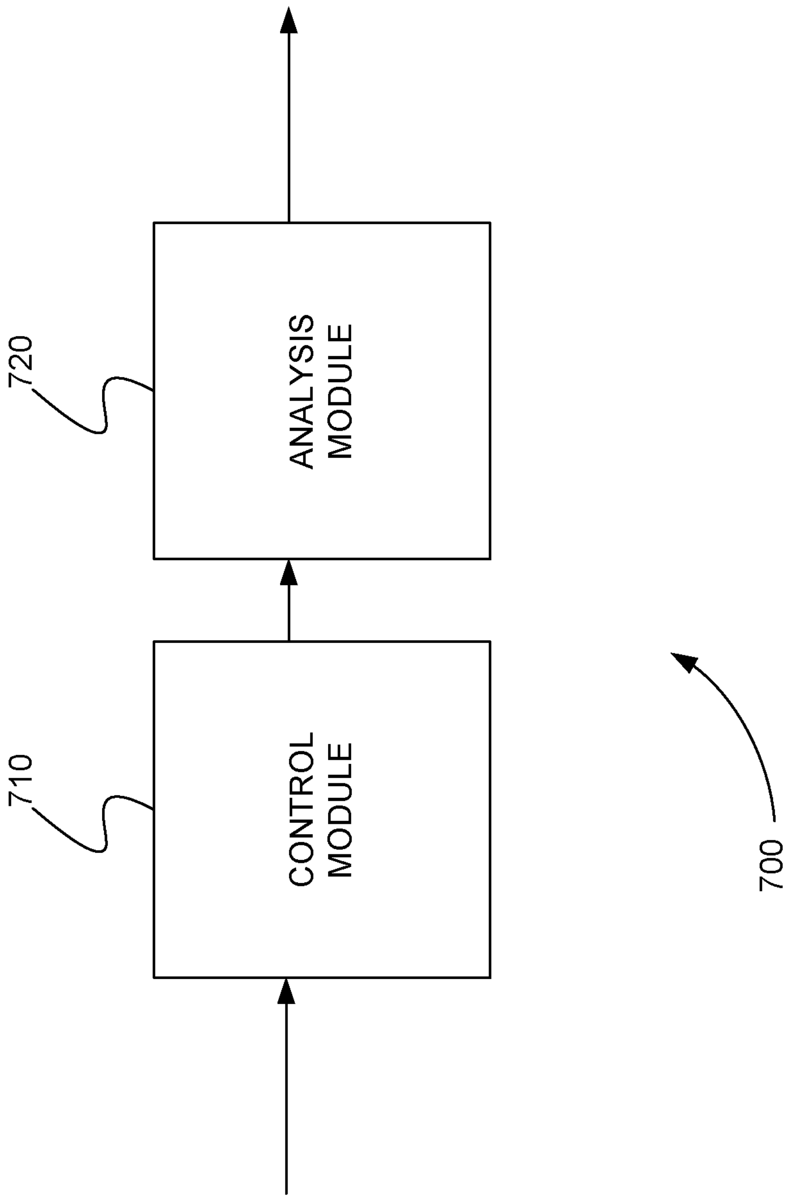
FIG. 7 is a schematic diagram of a system that includes one or more distinct software modules that performs a method for detecting and separately dissociating alkali-metal adducts of a compound in an IDA mass spectrometry experiment, in accordance with various embodiments.

FIG. 7 is a schematic diagram of a system 700 that includes one or more distinct software modules that performs a method for detecting and separately dissociating alkali-metal adducts of a compound in an IDA mass spectrometry experiment, in accordance with various embodiments. System 700 includes control module 710 and analysis module 720.

Control module 710 instructs an ion source device to ionize one or more compounds of a sample, producing an ion beam. Control module 710 instructs a mass filter of a tandem mass spectrometer to transmit a mass range of precursor ions from the ion beam. Control module 710 instructs a mass analyzer of the tandem mass spectrometer to measure intensities and m/z values of the precursor ions.

Analysis module 720 selects one or more of the precursor ions for a peak list of an IDA experiment.

For each pair of precursor ions of the peak list of the IDA experiment, if an m/z difference between the pair corresponds to an m/z difference between an alkali metal ion and another alkali metal ion or a proton, control module 710 instructs an ExD device of the tandem mass spectrometer to dissociate one precursor ion or both precursor ions of the pair.

Control module 710 instructs a CID device of the tandem mass spectrometer to dissociate all other precursor ions of the peak list of the IDA experiment.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. Apparatus for detecting and separately dissociating alkali-metal adducts of a compound in an information dependent acquisition (IDA) mass spectrometry experiment, comprising:

an ion source device that ionizes one or more compounds of a sample, producing an ion beam; and a tandem mass spectrometer that includes a mass filter device, an electron-based dissociation (ExD) device, a collision-induced dissociation (CID) device, and a mass analyzer and that creates precursor ion peak list of an IDA experiment by transmitting a mass range of precursor ions from the ion beam using the mass filter, measuring intensities and mass-to-charge ratio (m/z) values of the precursor ions using the mass analyzer, and selecting one or more of the precursor ions for the peak list, and dissociates each precursor ion of the peak list in the IDA experiment by, for each pair of precursor ions of the peak list, if an m/z difference between the pair corresponds to an m/z difference between an alkali metal ion and another alkali metal ion or a proton, dissociating one precursor ion or both precursor ions of the pair using the ExD device and by dissociating all other precursor ions of the peak list using the CID device.

2. The apparatus of claim 1, wherein the tandem mass spectrometer further measures intensities and m/z values of product ions of each precursor ion dissociated using the ExD device using the mass analyzer, producing an ExD product ion spectrum for each precursor ion dissociated using the ExD device.

3. The apparatus of claim 2, wherein the tandem mass spectrometer further identifies a compound of the sample by comparing an ExD product ion spectrum to a spectral library of product ions produced by electron ionization (EI).

4. The apparatus of claim 1, wherein the tandem mass spectrometer further measures intensities and m/z values of product ions of each precursor ion dissociated using the CID device using the mass analyzer, producing CID product ion spectrum for each precursor ion dissociated using the CID device.

5. The apparatus of claim 4, wherein the tandem mass spectrometer further identifies a compound of the sample by comparing a CID product ion spectrum to a spectral library of product ions produced by CID.

6. The apparatus of claim 1, wherein if the tandem mass spectrometer determines an m/z difference between the pair corresponds to an m/z difference between an alkali metal ion and a proton, tandem mass spectrometer dissociates one precursor ion of the pair using the ExD device.

7. The apparatus of claim 6, wherein the tandem mass spectrometer dissociates one precursor ion of the pair using the ExD device by dissociating a precursor ion of the pair that has a higher m/z value.

8. The apparatus of claim 1, if the tandem mass spectrometer determines an m/z difference between the pair corresponds to an m/z difference between an alkali metal ion and another alkali metal ion, tandem mass spectrometer dissociates one precursor ion of the pair using the ExD device.

9. The apparatus of claim 8, wherein the tandem mass spectrometer dissociates one precursor ion of the pair using the ExD device by dissociating a precursor ion of the pair that has a higher m/z value.

10. The apparatus of claim 8, wherein the tandem mass spectrometer dissociates one precursor ion of the pair using the ExD device by dissociating a precursor ion of the pair that has a higher intensity.

11. The apparatus of claim 1, wherein if the tandem mass spectrometer determines an m/z difference between the pair corresponds to an m/z difference between an alkali metal ion and another alkali metal ion, the tandem mass spectrometer dissociates both precursor ions of the pair using the ExD device.

12. The apparatus of claim 1, wherein the alkali metal ion comprises one of a lithium ion ($Li^+$), a sodium ion ($Na^+$), a potassium ion ($K^+$), a rubidium ion ($Rb^+$), a caesium ion ($Cs^+$), or a francium ion ($Fr^+$) and the two different alkali metal ions comprise any two of $Li^+$, $Na^+$, K+, $Rb^+$, $Cs^+$, or $Fr^+$.

13. The apparatus of claim 1, wherein the ExD device performs one of electron-induced dissociation (EID) or electron impact excitation in organics (EIEIO) for singly charged precursor ions and one of electron capture dissociation (ECD) or electron transfer dissociation (ETD) for multiply charged precursor ions.

14. A method for detecting and separately dissociating alkali-metal adducts of a compound in an information dependent acquisition (IDA) mass spectrometry experiment, comprising:
- instructing an ion source device to ionize one or more compounds of a sample using a processor, producing an ion beam;
- instructing a mass filter of a tandem mass spectrometer to transmit a mass range of precursor ions from the ion beam using the processor;
- instructing a mass analyzer of the tandem mass spectrometer to measure intensities and mass-to-charge ratio (m/z) values of the precursor ions using the processor;
- selecting one or more of the precursor ions for a peak list of an IDA experiment using the processor;
- for each pair of precursor ions of the peak list of the IDA experiment, if an m/z difference between the pair corresponds to an m/z difference between an alkali metal ion and another alkali metal ion or a proton, instructing an electron-based dissociation (ExD) device of the tandem mass spectrometer to dissociate one precursor ion or both precursor ions of the pair using the processor; and
- instructing a collision-induced dissociation (CID) device of the tandem mass spectrometer to dissociate all other precursor ions of the peak list of the IDA experiment using the processor.

15. A computer program product, comprising a non-transitory and tangible computer-readable storage medium whose contents include a program with instructions being executed on a processor so as to perform a method for detecting and separately dissociating alkali-metal adducts of a compound in an information dependent acquisition (IDA) mass spectrometry experiment, the method comprising:
- providing a system, wherein the system comprises one or more distinct software modules, and wherein the distinct software modules comprise a control module and an analysis module;
- instructing an ion source device to ionize one or more compounds of a sample using the control module, producing an ion beam;
- instructing a mass filter of a tandem mass spectrometer to transmit a mass range of precursor ions from the ion beam using the control module;
- instructing a mass analyzer of the tandem mass spectrometer to measure intensities and mass-to-charge ratio (m/z) values of the precursor ions using the control module;
- selecting one or more of the precursor ions for a peak list of an IDA experiment using the analysis module;
- for each pair of precursor ions of the peak list of the IDA experiment, if an m/z difference between the pair corresponds to an m/z difference between an alkali metal ion and another alkali metal ion or a proton, instructing an electron-based dissociation (ExD) device of the tandem mass spectrometer to dissociate one precursor ion or both precursor ions of the pair using the control module; and
- instructing a collision-induced dissociation (CID) device of the tandem mass spectrometer to dissociate all other precursor ions of the peak list of the IDA experiment using the control module.

* * * * *